United States Patent [19]

Hehl

[11] Patent Number: 4,865,534
[45] Date of Patent: Sep. 12, 1989

[54] INJECTION MOLDING MACHINE HAVING AN INJECTION MOLDING UNIT WITH MULTIPLE WORKING POSITIONS

[76] Inventor: Karl Hehl, Arthur-Hehl-Strasse 32, D-7298 Lossburg 1, Fed. Rep. of Germany

[21] Appl. No.: 192,709

[22] Filed: May 11, 1988

[30] Foreign Application Priority Data

May 11, 1987 [DE] Fed. Rep. of Germany ....... 3715628
Jul. 4, 1987 [DE] Fed. Rep. of Germany ....... 3722228

[51] Int. Cl.⁴ ..................... B29C 45/56; B29C 45/72
[52] U.S. Cl. ............................... 425/547; 264/328.8; 264/328.11; 425/575
[58] Field of Search ............... 425/574, 575, 576, 547; 264/328.8, 328.11

[56] References Cited

U.S. PATENT DOCUMENTS

| | | | |
|---|---|---|---|
| 3,086,244 | 4/1963 | Hehl | 425/192 |
| 3,806,294 | 4/1974 | Hehl | 425/574 |
| 3,836,301 | 9/1974 | Hehl | 425/192 |
| 4,090,836 | 5/1978 | vonder Ohe et al. | 425/574 |
| 4,285,659 | 8/1981 | Koike | 425/547 |

FOREIGN PATENT DOCUMENTS

| | | |
|---|---|---|
| 315470 | 5/1974 | Austria . |
| 138169 | 4/1985 | European Pat. Off. . |
| 1860806 | 1/1961 | Fed. Rep. of Germany . |
| 1256364 | 12/1967 | Fed. Rep. of Germany . |
| 2156843 | 5/1973 | Fed. Rep. of Germany . |
| 3612587 | 11/1986 | Fed. Rep. of Germany . |
| 3612588 | 11/1986 | Fed. Rep. of Germany . |

OTHER PUBLICATIONS

Karl Mörwald, "Einblick in die Konstruktion von Spritzgusswerkzeugen", Dec. 1965, pp. 17–20.

Primary Examiner—Jay H. Woo
Assistant Examiner—Timothy W. Heitbrink
Attorney, Agent, or Firm—Spencer & Frank

[57] ABSTRACT

An injection molding machine has an injection molding unit shiftable parallel to itself into a selected working position, dependent upon the location of the injection opening of the mold closing unit. The latter includes a stationary mold carrier having parts defining guide grooves oriented transversely to the injection axis. The injection molding unit has hydraulic power cylinders arranged symmetrically to the injection axis. Each hydraulic power cylinder has a piston rod on which the injection molding unit is supported. Each piston rod has a coupling terminus received in a respective guide groove for guiding the respective piston rod therein during motion of the injection molding unit between working positions. The coupling terminus of each piston rod is prevented by the respective guide groove from moving in a direction parallel to the longitudinal axis of the respective piston rod, whereby the piston rods are axially immobilized. Each hydraulic power cylinder has an axis lying in a single common plane which is inclined at an oblique angle to the horizontal. The transporting device for effecting the shifting motion of the injection molding unit comprises a platform which supports the piston rods via a support member.

13 Claims, 12 Drawing Sheets

INJECTION MOLDING MACHINE HAVING AN INJECTION MOLDING UNIT WITH MULTIPLE WORKING POSITIONS

BACKGROUND OF THE INVENTION

This invention relates to an injection molding machine which may selectively accommodate and use a first injection mold assembly having a central injection opening and a central mold cavity as well as at least one additional, second injection molding assembly which has an off-center injection opening for an asymmetrical injection.

The injection molding machine has a machine bed on which there is supported a mold closing unit as well as an injection molding unit. The latter may assume a first working position from which it may be moved into engagement with the first injection mold assembly lying in the central injection axis, aligned with the symmetry axis of the mold-closing unit. The injection molding unit may be moved against the first injection mold assembly by means of a hydraulic drive cylinder through a passage provided in the stationary mold carrier.

The injection molding unit may be displaced from the first working position into further working positions in which it may be moved selectively into engagement with additional injection mold assemblies with off-center injection axes and off-center injection openings, for an injection along an off-center injection axis.

The injection molding machine has a transposing mechanism to displace the injection molding unit parallel to itself from the first working position into the additional working positions in a transition plane containing the central injection axis.

In a known injection molding machines of the above-outlined type, as disclosed in German Gebrauchsmuster No. (utility patent) 1,860,806, a central injection for a first mold assembly or a non-central injection for a second mold assembly (having a non-central injection opening and a central mold cavity) is arbitrarily selectively feasible. In this manner the less utilized non-central injection process which is preferably utilized for making large-surface synthetic parts by an angled lateral injection may be used in the same injection molding machine without the need for pivoting the injection molding unit. The injection molding unit of the prior art is, together with the platform which supports it, moved into the desired injection position for the non-central injection by shifting in a horizontal and/or vertical direction. The hydraulic drive cylinders which effect the parallel shift are situated underneath the platform and are affixed directly thereto. This construction is disadvantageous in that it requires a relatively tall shifting arrangement. Consequently, the force with which the injection nozzle is urged against the injection mold assembly is introduced into the machine bed at such a height level that in case of a non-central injection opening, such level is at a relatively large distance from the axis of injection. This results in significant tilting torques during the insertion of the injection molding unit onto and its removal from the injection mold assembly. Such tilting torques have a significantly adverse effect on the accuracy of alignment of the nozzle with the injection opening of the mold assembly. In inaccurate alignment manifests itself in fluctuations in the flow passage cross section between the nozzle opening and the injection opening and thus irregularities in the injection speed occur. This is particularly the case if the nozzle assembly has no selfcentering means. Furthermore, the known construction does not permit a truly high-precision injection which requires an exactly reproducible injection axis for each cycle of injection and also for any change in the conditions of injection or changes of materials to be utilized. It is a further disadvantage of the construction according to the prior art that it makes the required maintenance work on the plasticizing cylinders after longer service periods cumbersome. This applies particularly to the removal of the feed screw, and it also applies to the emptying injection stroke of the injection molding unit when the material utilized is to be changed. This involves relatively complex procedures and is time-consuming inasmuch as with the change of the type of injection (central or non-central injection) often a change in material is involved which, in turn, requires a cleaning or replacement of the plasticizing cylinder.

In other known injection molding machines of the aboveoutlined type, as disclosed, for example, in Austrian Patent No. 315,470, as well as German Patent Nos. 3,612,587 and 3,612,588 one may selectively use for a first working position of the injection molding unit a first injection mold assembly having an injection opening lying in the central injection axis and for an additional working position an additional injection mold assembly having an injection opening through which material is injected into the parting plane of the mold assembly. The injection axis of the additional working position is oriented perpendicularly to the central injection axis of the first working position. The injection molding unit is pivotal by means of a pivoting mechanism from the first working position into the second working position. The operation in the second working position is conventionally referred to as "linear injection". Such linear injection makes possible an injection which is lateral (thus, asymmetrical) to the mold cavity while, at the same time, the injection mold cavity may be arranged symmetrically with the central axis of the second injection mold assembly. In this connection, reference is also made to FIG. 19 of a monograph by Karl Mörwald, entitled "Einblick in die Konstruktion von Spritzgusswerkzeugen"("Brief Survey of the Construction of Injection Molding Tools") issued December 1965. Such a result, to be sure, may also be achieved in a first working position which is transverse to the parting plane of the injection mold assembly in case the injection mold cavity comprises a plurality of individual cavities which are arranged symmetrically about a central injection opening in the mold. Reference is made in this connection to FIGS. 16 and 17 of the monograph. The possibility of such an arrangement, however, is no longer present in case the article to be made by the injection molding requires, because of its relative dimensions, an injection mold cavity which occupies the entire width or height of the injection mold assembly. In such a case, some articles of specific configuration may only be made by a "linear injection" to ensure an acceptable quality. This applies, for example, to optical lenses in which a central (thus, symmetrical) injection by virtue of a break-off of the burr may cause damages to the lens surface in the critical zone of the axis of symmetry. A "linear injection" is further expedient in case of extremely slender, narrow articles made of highly transparent synthetic material used, for example, as observation windows in plastic containers. For such articles a "linear injection" leads to optically more favorable results. Furthermore, in case of significantly elongate, narrow articles (for example, rulers) made of fiber-reinforced synthetic material, a "linear injection" makes possible a uniform orientation of the fibers over the entire surface which would not be the case if a central, symmetrical injection is performed, because in the injection zone there would occur a disorientation of the fibers and thus a reduction of the breakage resistance in that zone.

It is of importance in the above-discussed arrangements that the mold cavity and thus the mold separating forces are capable of being oriented approximately symmetrically to the central axis of the injection mold assembly during injection.

Furthermore, it has been known for decades to arrange the injection molding unit selectively to effect a central, symmetric injection transversely to the parting plane of the injection mold assembly or a "linear injection" in the parting plane. In this connection reference is made to U.S. Pat. Nos. 3,086,244 and 3,836,301 as well as German Auslegeschrift (examined published application) No. 1,256,364. Because of the fact that the selective working positions are effected by changing the position of the injection molding unit by means of a hoisting mechanism, such an operation is not adapted to be automated. Even if the different working positions are attainable by means of a drivable pivotal mechanism, such arrangement is complex and involves considerable expense. Further, for example, a vertical orientation of the injection molding unit for the "linear injection" into the parting plane of the injection mold assembly requires, in case of large injection molding machines, a very substantially vertical space which often is not available. Even a horizontal injection molding unit which injects into the parting plane requires a very significant space for the injection molding machine because the injection axis extends significantly beyond the support surface of the machine transversely to the length thereof.

SUMMARY OF THE INVENTION

It is an object of the invention to provide an improved injection molding machine of the above-outlined type in which all requirements occurring in practice and involving the making of plastic components of different configuration and size and the use of plastic materials of different physical properties may be taken into account and further, the basic conditions for an automation of the conversion of the injection molding unit into the desired working positions can be effected with a relatively modest technological input.

This object and others to become apparent as the specification progresses, are accomplished by the invention, according to which, briefly stated, the stationary mold carrier has, at its reverse side, parts defining guide grooves oriented transversely to the central and off-center injection axes. Further, a driving arrangement includes hydraulic power cylinders arranged symmetrically to the central and off-center injection axes. Each hydraulic power cylinder has a piston rod on which the injection molding unit is supported. Each piston rod has a coupling terminus received in a respective guide groove for guiding the respective piston rod therein during motion of the injection molding unit between working positions. The coupling terminus of each said piston rod is prevented by the respective guide groove from moving in a direction parallel to a longitudinal axis of the respective piston rod, whereby the piston rods are axially immobilized. Each hydraulic power cylinder has an axis lying in a single common plane which is inclined at an oblique angle to the horizontal. The transposing mechanism comprises a platform on which the piston rods —and thus the injection molding unit —are supported by a support member.

In an arrangement according to the invention, by virtue of a positioning of the drive cylinders symmetrically with respect to the injection axis, the height of the shifting structure is significantly reduced. Furthermore, the appearance of tilting torques in such a design is avoided and inaccuracies of positioning the nozzle at the injection opening of the mold assembly are permanently reduced even in case of a significantly off-center injection and in case of nozzles which have no self-centering means. The ready longitudinal guidance of the coupling terminus of each piston rod in the grooves of the mold carrier is advantageous in that the injection molding unit is ready to perform a parallel shift (for assuming another working position) as soon as the pressing force on the nozzle during injection of the synthetic material is removed and thus the piston rods are no longer immobilized for shifting motion in the grooves of the mold carrier. Such a sliding support of the piston rods in the mold carrier cooperates, according to the invention, with a support of the piston rods by means of a support member on the platform which carries the injection molding unit.

In a structural arrangement according to the invention as outlined above, the injection opening of the additional (second) injection mold assembly is oriented parallel to the injection opening of the first injection mold assembly and merges, as in the "linear injection", laterally into the injection mold cavity which is oriented approximately symmetrically to the central axis.

Contrary to the "linear injection", however, the introduced synthetic material is, upon its entrance into the mold cavity at its wall at the edge zones, deflected in the direction of the center of the mold cavity while a desired turbulence is achieved. The mold cavity is, in turn, arranged with high precision symmetrically to the central axis of the injection mold assembly in order to ensure that the mold separating forces are substantially symmetrical to the central axis. Such an asymmetrical injection which is parallel to the central injection axis fulfills all the functions of the conventional "linear injection" in that there is feasible an arrangement of the injection mold cavity symmetrically to the central axis of the injection mold assembly to thus ensure a similar arrangement of the mold separating forces. The injection molding unit, for the selective use of different injection mold assemblies, may be set onto the desired injection opening by a simple displacement parallel to itself. Based on such a parallel shift, the mechanism for transposing the injection molding unit into further working positions may be simplified, while only a space for the injection molding machine is needed, particularly, when such a shift is effected in a horizontal or a vertical direction.

According to a further feature of the invention, all off-center injection axes lie in the transposing plane parallel to the central axis and are situated on the same side of the transposing plane relative to the central axis. Further, the guide grooves which are formed in the stationary mold carrier are open to allow travel of the coupling terminus of each piston rod out of the guide grooves to thus permit a complete removal of the injection molding unit from the stationary mold carrier in a direction parallel to the central injection axis. By virtue of these features, the optimal conditions for an emptying injection of the injection molding unit after termination of the injection process are provided which is needed for each change of plastic material without the requirement of additional means such as conventional cooling plates. The parallel shift provides the possibility of an emptying injection stroke of the plasticizing cylinder for the required material change in the other working position of the injection molding unit without significant technological input. The cleaning of the plasticizing cylinder by the emptying injection stroke may be readily program-controlled because such an emptying stroke generally corresponds to a normal injection cycle.

According to a further feature of the invention, the basic conditions are provided for a programmable "removing position" in which the plasticizing cylinder may be axially pulled off the injection molding unit as the latter has been pivoted to a maximum angle. Further, the injection molding unit may be set in a programmable "material ejecting position" in which the injection molding unit may be voided of the plastic material by expelling the same as if performing injection, for changing the plastic material. Such expelled synthetic material, as it engages the cooled rearward surface of the mold carrier, hardens and drops off and may be readily carried away.

The particular manner in which guide columns of the transposing device are supported on the machine bed according to a further feature of the invention makes possible a simple retrofitting of an injection molding machine with the shifting (transposing) device provided as a structural unit since such unit may be installed on or removed from the machine bed with a few simple manipulations.

As concerns the concept of "additional working positions" for "non-central" injection axes, the following additional observations are made:

In seeking to achieve an optimal flow condition for a predetermined article to be made with a mold assembly having a central injection opening, one may find, for example, that such an optimum condition can be achieved if the injection opening is situated only slightly off the central injection axis. In such a case the synthetic material is introduced not at the edge of the injection mold cavity but is admitted into the central zone thereof. Within the meaning of the invention this involves a "further working position" with a non-central injection axis. Thus, injections may be effected which only depart slightly from a central injection.

It is known by itself to set a horizontal injection molding unit by means of a hoisting frame vertically onto the parting plane of an injection molding assembly which may be clamped in different heights into a vertical mold closing unit, as disclosed in German Offenlegungsschrift (non-examined published application) No. 2,156,843. It is further known, for example, from European published patent Application No. 138,169 to shift two injection molding units which are arranged side-by-side horizontally on a machine bed in order to inject selectively different synthetic materials into an injection mold assembly held in a horizontal mold closing unit.

DESCRIPTION OF THE PREFERRED EMBODIMENTS

Figure 1:
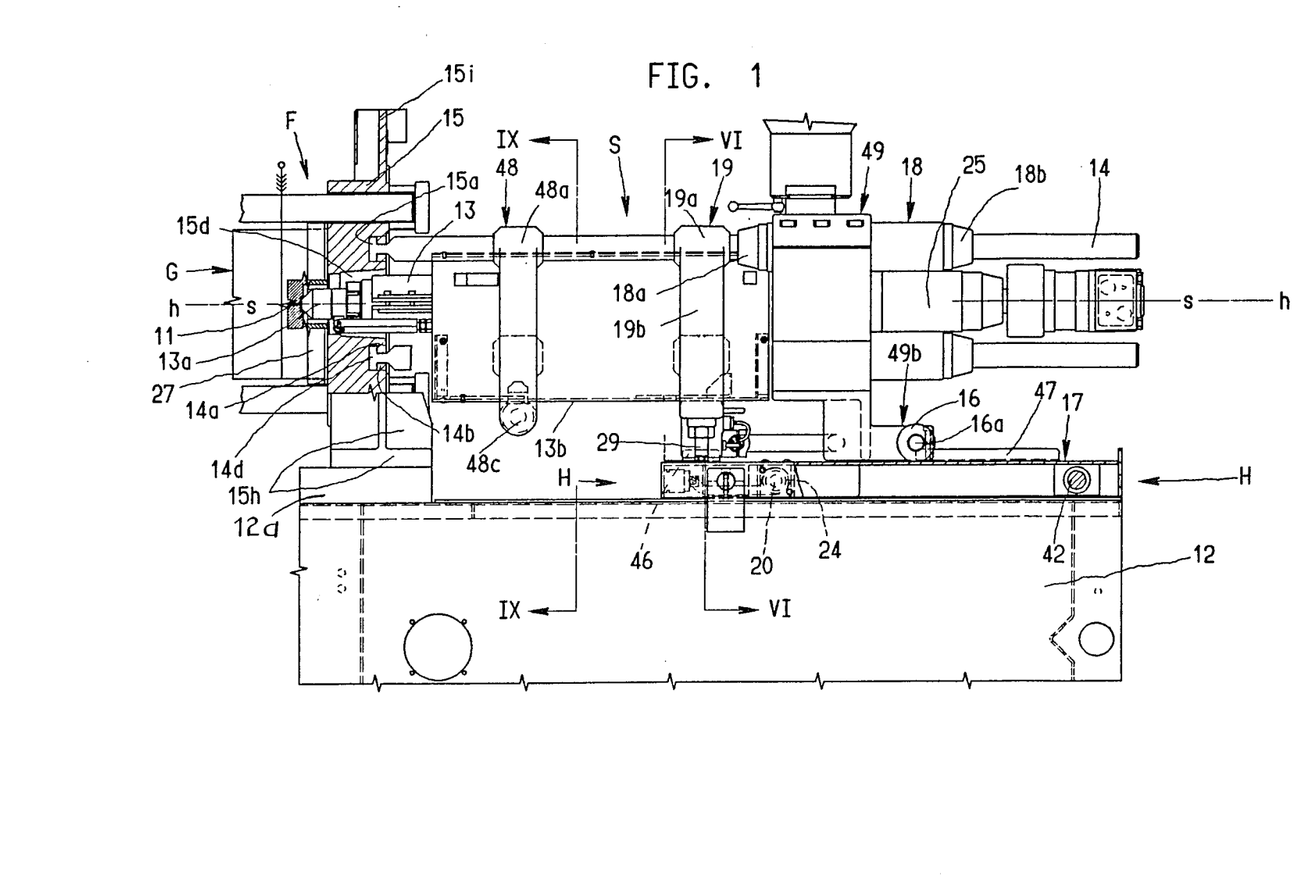
FIG. 1 is a schematic side elevational view, partially in section, of an injection molding machine incorporating a preferred embodiment of the invention and showing the injection molding unit of the machine positioned to operate in the central injection axis.
Figure 2:
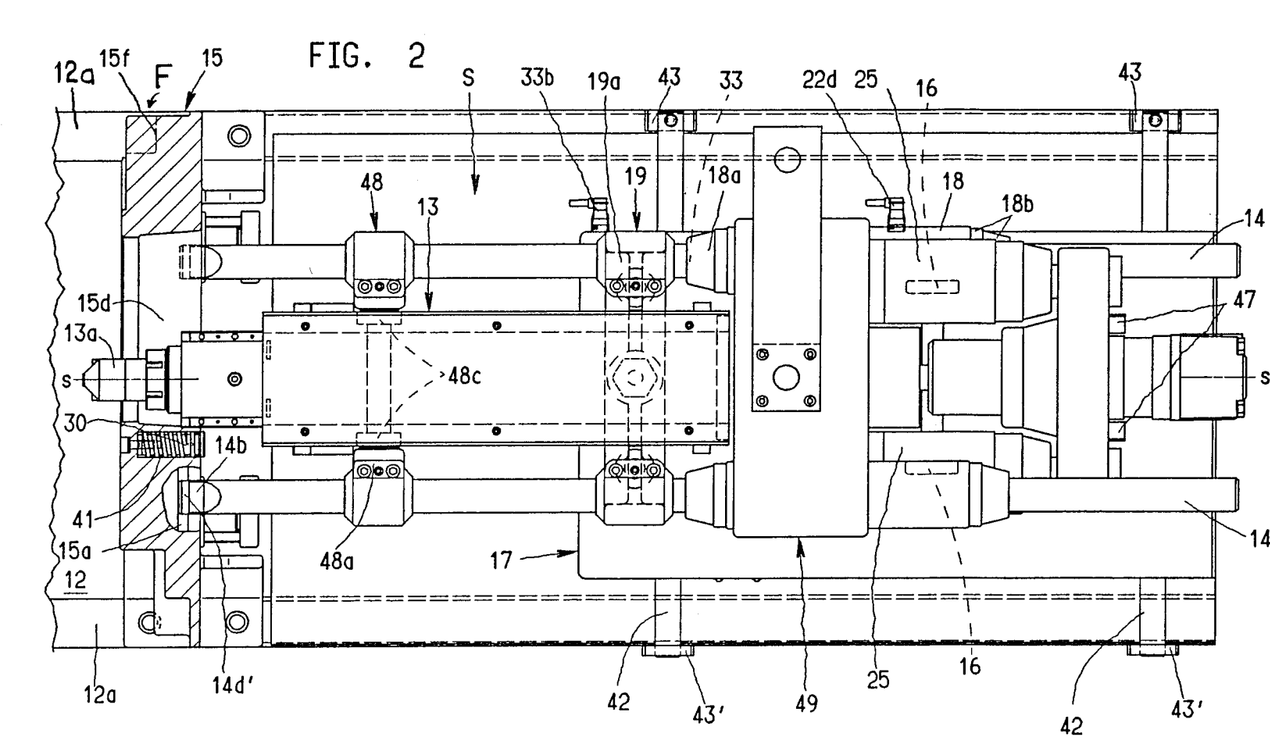
FIG. 2 is a schematic top plan view, partially in section, of the construction and its position shown in FIG. 1, with the injection mold assembly removed.
Figure 3:
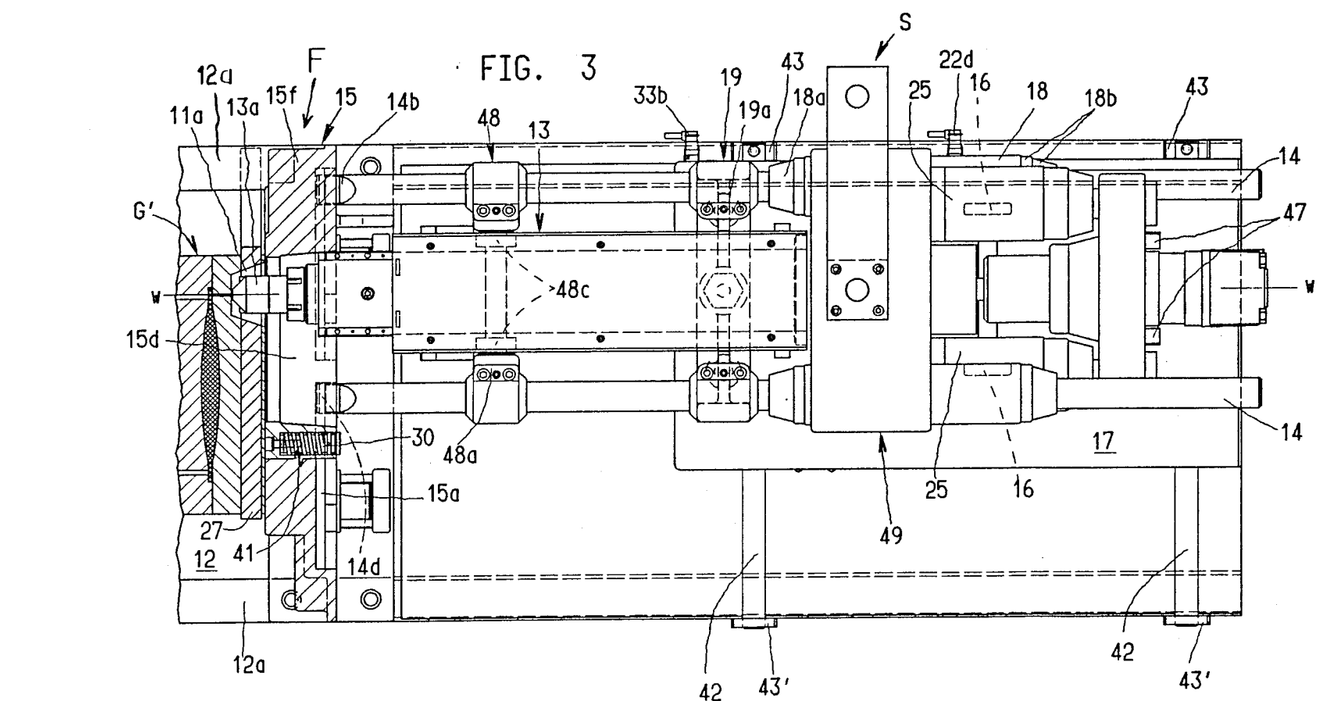
FIG. 3 is a schematic top plan view, partially in section, of the injection molding machine of FIG. 1, showing the injection molding unit of the machine positioned to operate in a non-central injection axis.

Turning to FIGS. 1, 2 and 3, there is illustrated an injection molding machine whose machine bed 12 supports a mold closing unit F. The mold closing unit F has a stationary mold carrier 15 which is centered on parallel guide bars 12a of the machine bed 12. The stationary half of an injection mold assembly G (FIG. 1) or G' (FIG. 3) may be clamped by means of an engagement plate 27 of the injection mold assembly against the stationary mold carrier 15 which is provided with an aperture 15d for the passage of the nozzle 13a of the plasticizing unit 13 of the injection molding unit S of the injection molding machine.

Figure 5:
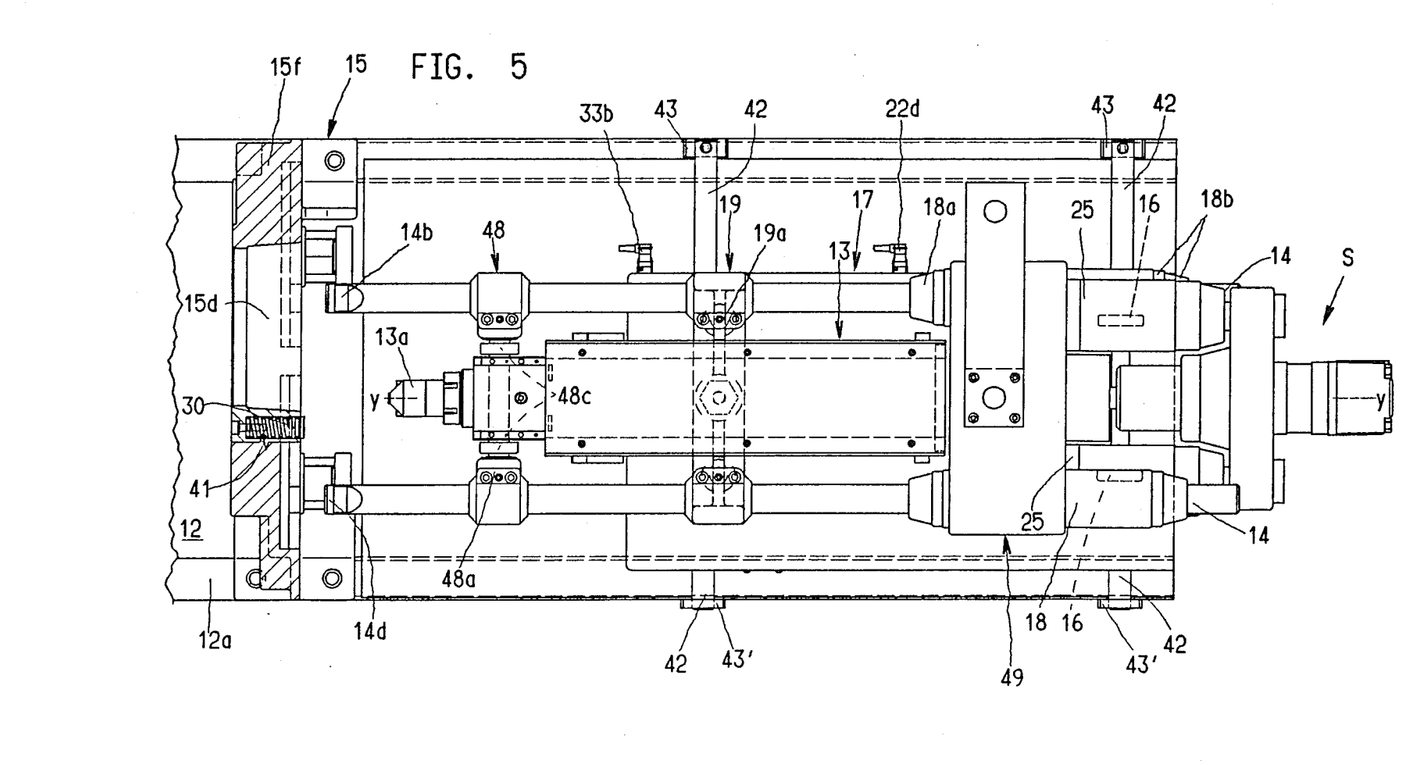
FIG. 5 is a schematic top plan view, partially in section, of the injection molding machine of FIG. 1, shown in a removal position.

For performing the injection cycles of the injection process, the injection molding unit is, as a rule, cyclically moved into engagement with the injection mold assembly G or G' and, after injection of the material, removed therefrom. This operation is effected by a hydraulic drive cylinder unit 18 whose pistons (not shown) are affixed to the axially supported piston rods 14. The injection molding unit S is shiftably supported on the piston rods 14 which are, with frontal terminal ends 14d (see FIG. 5) axially affixed to the stationary mold carrier 15. In the zone of hydraulic injection cylinders 25 the injection molding unit S is supported at the rear by means of rollers 16 on a platform 17 of a shifting device H by means of which the injection molding unit S may be horizontally displaced in the lateral direction (that is, perpendicularly to the central injection axis s—s). During the injection cycles the weight of the axially back-and-forth reciprocated injection molding unit S is taken up in the rearward zone by the platform 17 of the shifting device H. The rollers 16 are mounted on a shaft 16a of a bearing component 49b of a carrier body 49.

The injection molding unit S is guided by cylinder covers 18a and 18b of the hydraulic drive cylinders 18 on the piston rods 14 which, in turn, are supported by means of U-shaped support components 19 on the platform 17 of the shifting device H. The free ends of the vertical U legs 19b of the support component 19 are formed as sleeves 19a which surround the piston rods 14 and function as clamping supports. The support component 19 is, in turn, supported on the platform 17 by a mechanism 29 for adjusting the injection axes.

In FIG. 1 the injection molding unit S is shown in a first working position in which the associated injection axis s—s is centrally located and situated in the symmetry axis of the mold closing unit F, coaxially with a central injection channel (injection opening) 11 of the injection mold assembly G. The frontal part of the plasticizing unit 13 of the injection molding unit S can be moved through the aperture 15d of the stationary mold carrier 15 to be brought into operative engagement with the injection mold assembly G designed for a central injection.

Figures 13, 14:
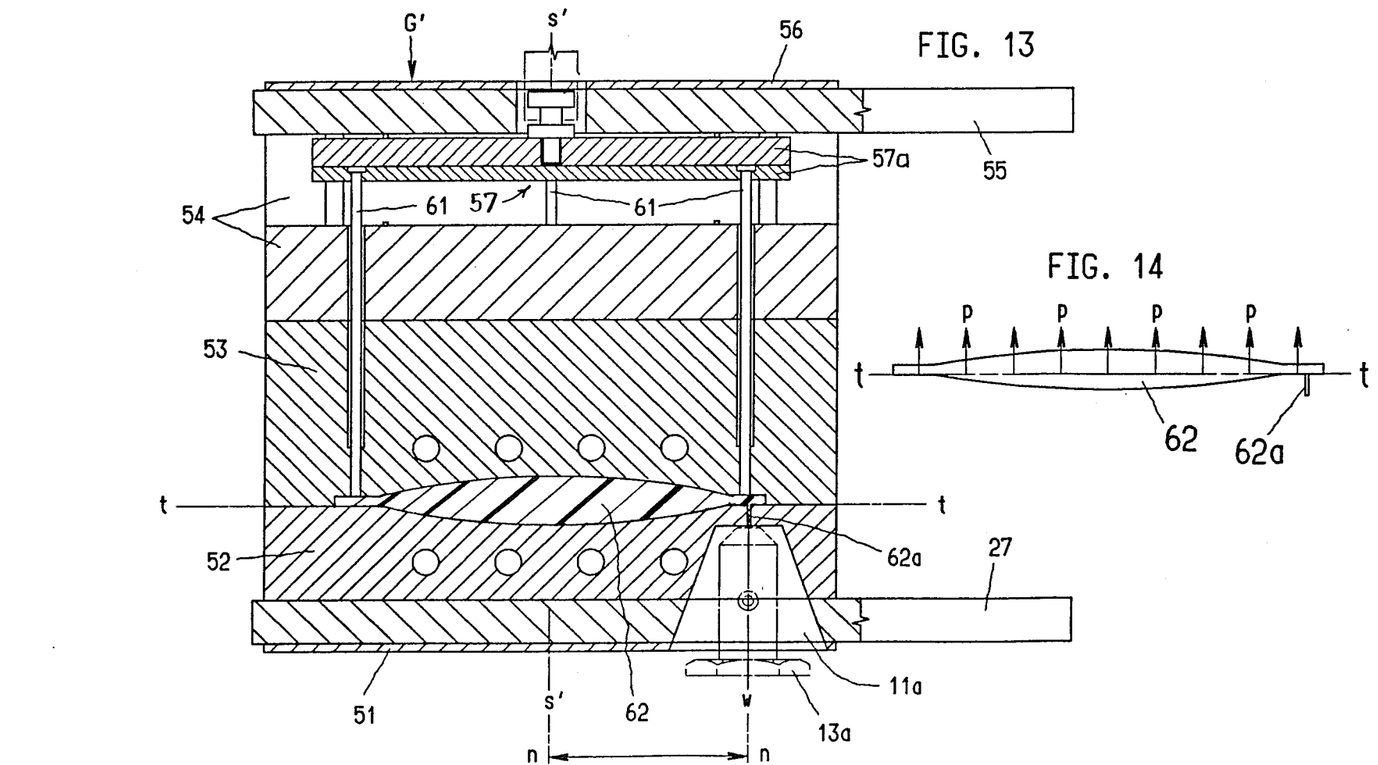
FIG. 13 is a sectional view taken along line XIII—XIII of FIG. 12.
FIG. 14 is a diagram illustrating a finished injected article in elevation and the mold separating forces effective during injection of the material into the mold cavity.

The injection molding unit S may be moved into at least one further working position in which it can be moved into operative engagement with an injection mold assembly G' (FIG. 3) designed for an asymmetric injection and, as shown in FIG. 13, having an injection channel (injection opening) 11a situated at a distance n—n from the central axis s'—s'. The injection occurs along a non-central injection axis w—w. The transposition of the injection molding unit S is carried out in a position thereof which remains axially parallel to the central injection axis s—s. Thus the transposition is effected by a simple parallel shift. One or more selectively adjustable injection axes w—w are thus oriented parallel to the central injection axis s—s.

The piston rods 14 are shiftably supported in horizontal guides 15a of the stationary mold carrier 15. Upon shifting of the injection molding unit S the piston rods 14 travel in the groove-like guides 15a which are arranged bilaterally of the aperture 15d of the stationary mold carrier 15 extended into the direction of lateral shift of the injection molding unit S. For an axial immobilization of the piston rods 14 each is engaged in its guide 15a at the end 14d in the zone of diametrically opposite constrictions 14b. Terminal shoulders 14a of the piston rods 14 are pressable against corresponding shoulders of the guides 15a for absorbing the counterpressure of the nozzle pressing forces. The guides 15a are angled components shaped from the cast constituting the stationary mold carrier 15.

Figure 9:
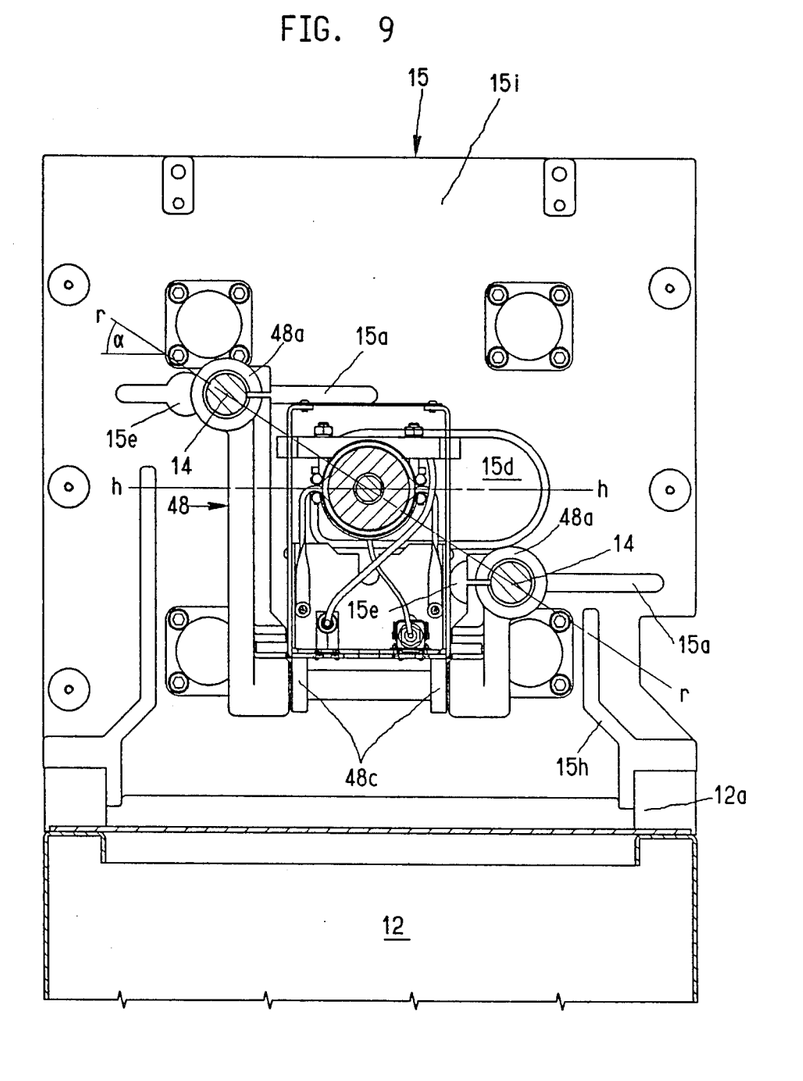
FIG. 9 is a sectional view taken along line IX—IX of FIG. 1.
Figure 10:
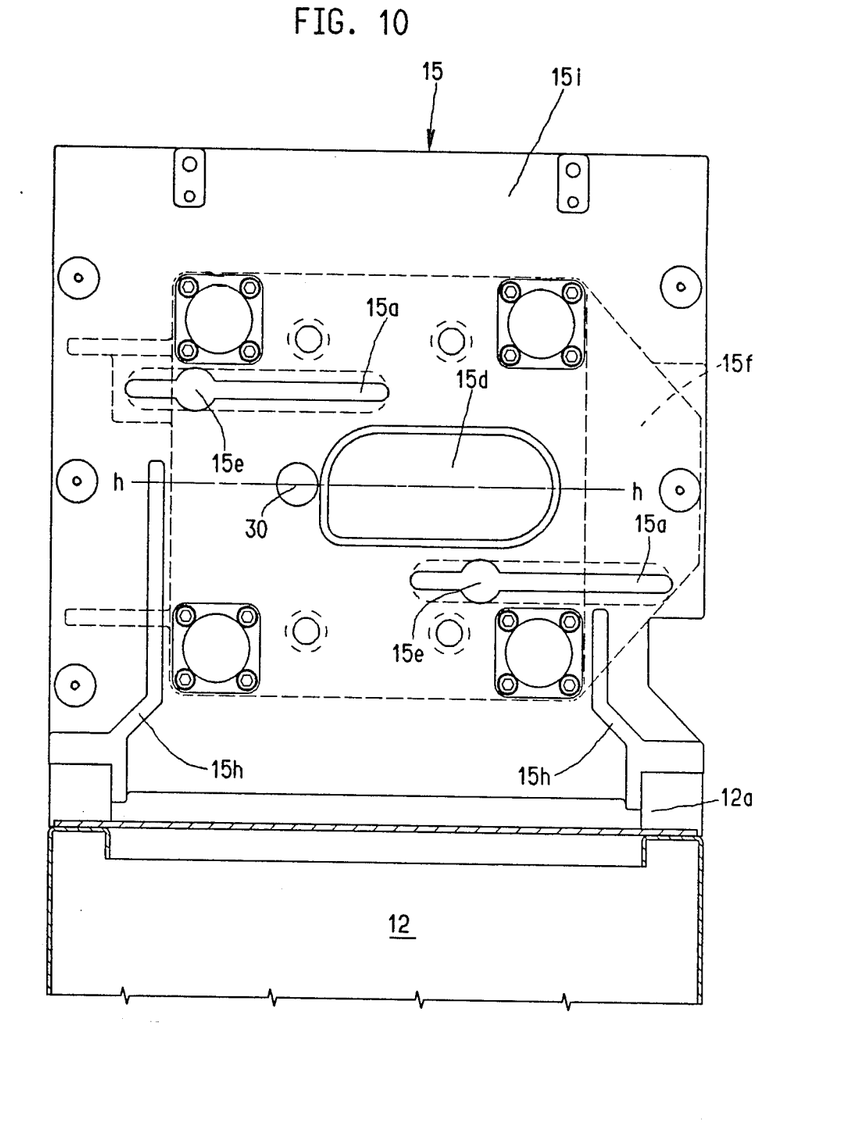
FIG. 10 is a view similar to FIG. 9 with the injection molding unit of the machine removed.

The arbitrarily selected further working positions of the injection molding unit S having non-central injection axes w—w are situated next to the central injection axis s—s, thus, on one side of the central injection axis s—s, in the horizontal transposition (shifting) plane h—h. The selectively settable injection axes w—w intersect the stationary mold carrier 15 within the inner width of the aperture 15d extended in the direction of shift. As may be observed in comparing FIGS. 2 and 3, the injection axis w—w for a non-central injection opening of the injection mold assembly G' is at a maximum distance from the central injection axis s—s as determined approximately by the width of the aperture 15d. From the first working position with central injection axis s—s the injection molding unit S is movable also in further positions (other lateral positions) which are situated in the plane h—h on the other side of the central injection axis s—s. In this case, the injection axis y—y (FIG. 5) is situated at a distance from the central injection axis s—s which approximately corresponds to the diameter of one piston rod 14. In this position the injection molding unit S may be pulled axially off the mold carrier 15. This is made possible by providing the guides 15a with recesses 15e (FIGS. 9 and 10) in a guide portion effective in the removal position, for axially releasing the ends 14d of the piston rods 14.

A removal of the injection molding unit S from the guides 15a of the mold carrier 15 is thus effected by performing the following steps:

The injection molding unit S is transposed to be in alignment with the injection axis y—y (FIG. 5) to thus assume its removal position. Thereafter, with the aid of the drive cylinders 18, it is set on the injection mold assembly G or G'. Subsequently, the drive cylinders 18 are actuated in a manner as it would be required in the normal injection process in each injection cycle, for effecting an engagement of the injection molding unit S with the injection mold assembly G or G' from a withdrawn position of the injection molding unit S. By virtue of the axial engagement of the nozzle 13a of the plasticizing unit 13 with the injection mold assembly G or G', the above-noted actuation of the driving cylinder 18 results in a rearward (reverse) stroke of the carrier columns (piston rods) 14, during the course of which the latter are pulled out of the guides 15a in an axial direction. At the same time, the adjusting means 29 of the support component 19, by means of which the injection molding unit S removed from the guides 15a rests on the platform 17, slides on the upper face of the platform 17.

Figure 4:
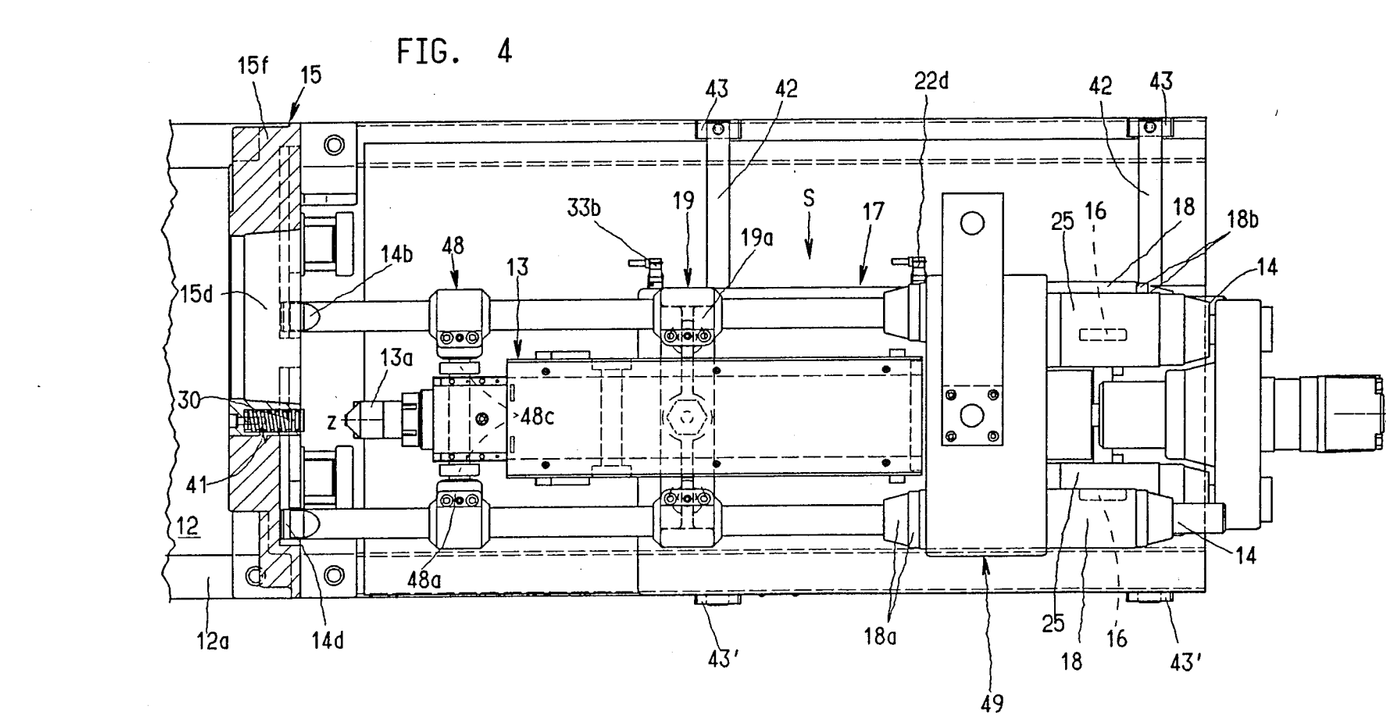
FIG. 4 is a schematic top plan view, partially in section, of the injection molding machine of FIG. 1, shown in the material expelling position.

In the remote-side position (material expelling position) which may be attained as a result of a further motion of the shifting device H of the injection molding unit S, the injection axis z—z lies externally of the cross-sectional zone of the aperture (passage) 15d of the mold carrier 15, as shown in FIG. 4. Such a material expelling position is effected when the injection molding process is to be continued with another plastic material. During the emptying of the plasticizing cylinder the nozzle 13a is situated at an axial distance from the rearward surface of the mold carrier 15. After the plasticized synthetic material has been ejected from the nozzle 13a by an axial injection stroke of the conveyor screw within the plasticizing cylinder, the ejected plasticized material impinges, in the injection axis z—z, on the rear face of the mold carrier 15 which is cooled by means of a cooling channel 41 provided at the circumference of a screw bolt 30. The cooling channel 41 is bounded by the surface of the screw bolt 30, occupied by screw threads and the inner wall of the bore which is provided in the mold carrier 15 and which surrounds the screw bolt 30. The latter projects from the rearward surface of the mold carrier 15 by an end which constitutes an impact face for the ejected plastic material. Upon impingement of the hot synthetic material on the impact face, the material solidifies and drops off and can be readily carted away.

In all the selective working positions of the injection molding unit S the piston rods 14 extend symmetrically to the respective injection axis s—s, w—w or, as the case may be, y—y and z—z so that any tendency of misalignment of the injection molding unit is eliminated. In recapitulation, the central injection axis s—s divides the transposing plane h—h into first and second sides. While the injection axis w—w (and any additional injection axes w—w associated with a mold assembly having an off-center injection opening) is situated in the transposing plane h—h on the first side thereof, the injection axes y—y (removal position) and z—z (expelling position) lie in the transposing plane h—h on the second side thereof.

Figure 6:
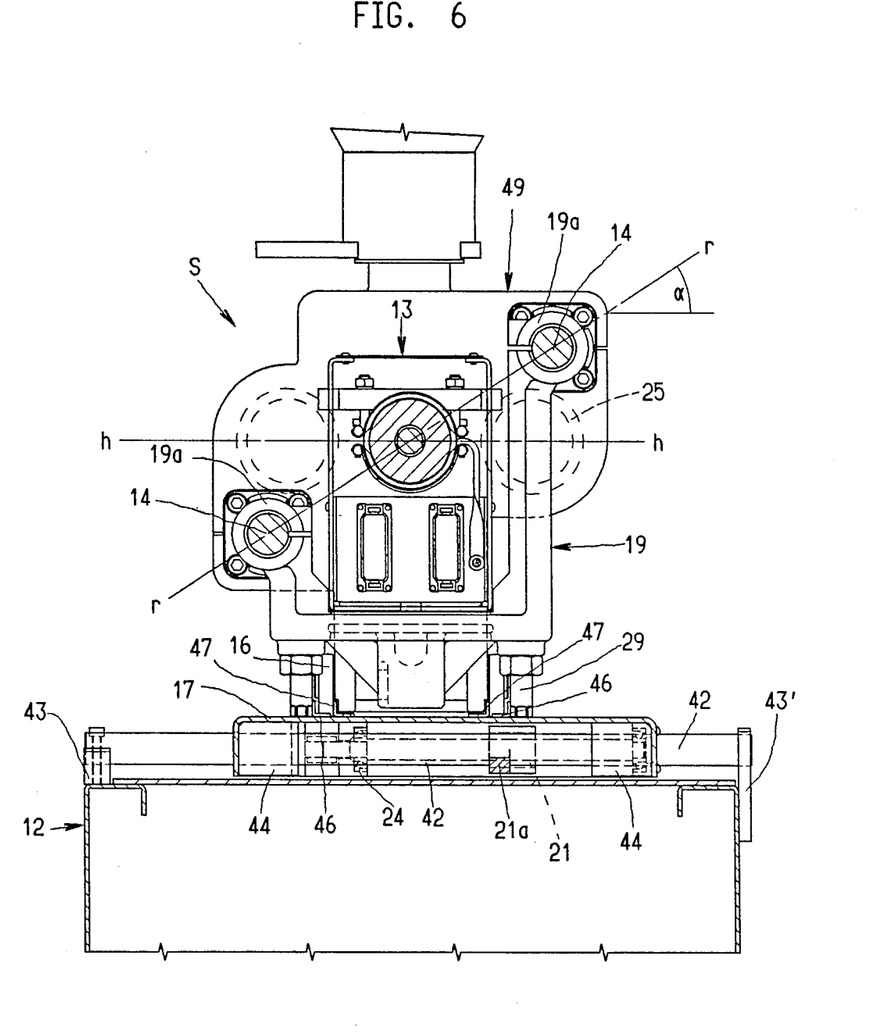
FIG. 6 is a sectional view taken along line VI—VI of FIG. 1.
Figure 7:
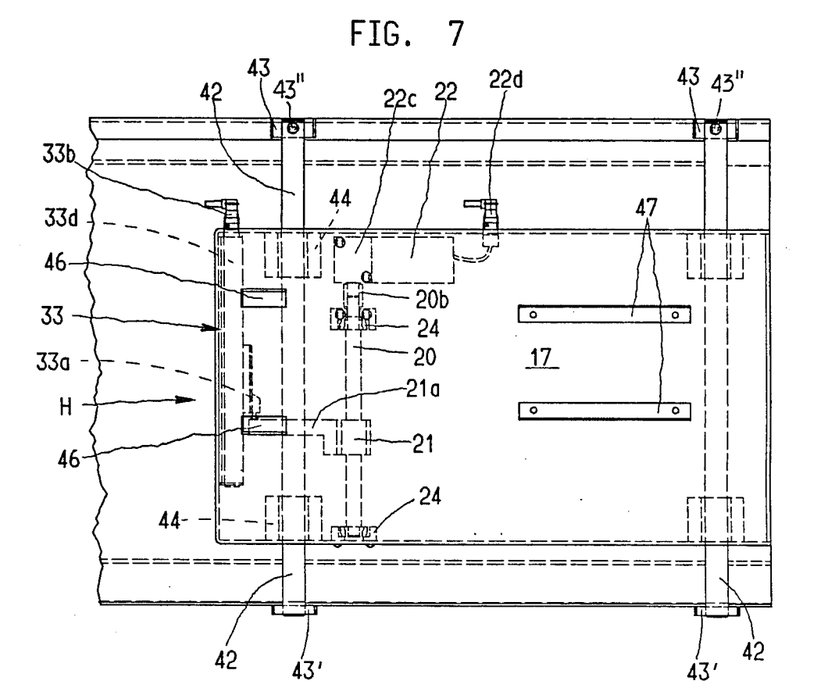
FIG. 7 is a schematic top plan view of a part of the injection molding machine of FIG. 1.
Figure 8:
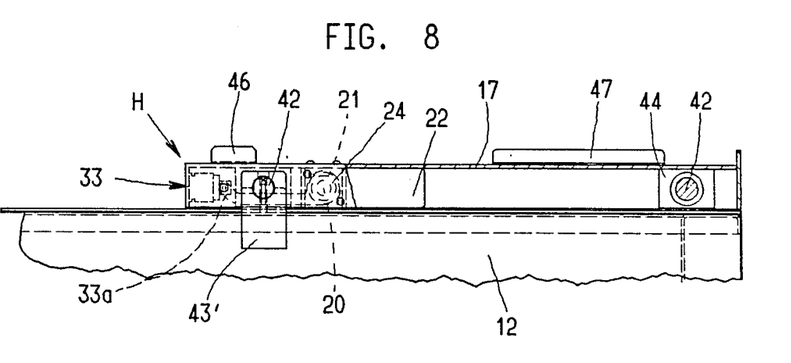
FIG. 8 is a schematic side elevational view of the construction shown in FIG. 7.

With particular reference to FIGS. 7 and 8, the shifting device H includes a linear potentiometer 33 which functions as a displacement measuring (position determining) device and which is secured to the platform 17. The linear potentiometer 33 has a sled 33a which is connected with a bearing element 21a. The linear potentiometer 33 is coupled by means of terminal 33b to the control computer of the injection molding machine and delivers to the computer signals which are required to achieve the desired working position of the injection molding unit S. For each working position, including the "removal position" and the "material expelling position" a programmed horizontal motion of the shifting device H suffices, in combination with an axial displacement of the injection molding unit S which is effected by the hydraulic drive cylinders 18. During this occurrence, the coupling ends 14d of the carrier columns 14 are freed for displacement in the groove-like guides 15a when the counter pressure derived from the nozzle engagement force is removed by withdrawing the injection molding unit S from the respective injection mold assembly G, G'. The flow of the coolant through the channel 41 in the mold carrier 15 is also controlled as a function of the transition of the injection molding unit S into the "material expelling position" according to the program of the computer. As it may be observed particularly from FIGS. 9 and 10, the two identically configured groove-like guides 15a are situated above and below the aperture 15d provided in the mold carrier 15. The cylinders proper of the hydraulic drive cylinders 18 are formed by bores provided in the carrier body 49. For stiffening the stationary mold carrier 15 the latter has, at its circumference, a circumferential shield 15i as well as ribs 15h. As it may be observed in FIG. 10, the mid zone of the mold carrier 15 is extended on the right side by a portion 15f in order to ensure a sufficient stability. The piston rods 14 of the injection molding unit S are located in a plane r—r (FIGS. 6 and 9) which contains the central injection axis s—s and which forms an angle α with the horizontal. Both hydraulic injection cylinders 25, on the other hand, lie in a horizontal plane which contains the central injection axis s—s.

The injection molding unit S is supported at the frontal (nozzle) end of the plasticizing unit 13 on the piston rods 14 by means of a guide yoke 48 having rollers 48c which engage the underside of a protective four-sided casing 13b of the plasticizing unit 13. Clamping sleeves 48a of the guide yoke 48 surround the piston rods 14.

As shown in FIGS. 7 and 8, the sheet metal platform 17 is horizontally displaceably supported on guide columns 42 by means of ball sleeves 44 fixedly attached to the inside of the platform 17. At one end, the guide columns 42 pass through bearing openings of respective shackles 43' welded to the adjacent wall portion of the machine bed 12. At the other end, each guide column 42 rests in an upwardly open, cradle-like bearing recess of a bearing part 43 which is welded to the machine bed 12. Each guide column 42 is affixed to the respective bearing part 43 with the aid of a securing screw 43". The support element 21a is, by means of clamping screws, fixedly attached to one of the guide columns 42 and carries a traveller nut (roller ball nut) 21. The latter is threaded on a spindle (roller ball spindle) 20 which is supported in ball bearings 24 mounted on the platform 17. A drive gear 22c of a drive motor 22, having a terminal 22d, is drivingly connected to the spindle 20 by a clutch 20b.

By rotating the spindle 20 in the one or the other sense by the motor 22, the nut 21 will travel in the one or the other axial direction of the spindle 20, thus displacing the platform 17 accordingly. The machine bed 12 is, by the manufacturer, made essentially with the shackles 43' and bearing pieces 43 and delivered independently of whether the customer wishes a machine with or without a shifting device H. The shifting device H is made as a structural unit and, in case of retrofitting, may be installed on the machine bed 12 with a few manual operations. For this purpose, the guide columns 42 are inserted, at one end, into the openings of the brackets 43' and, at the other end, positioned into the open bearing recesses of the brackets 43 and secured by screws 43".

In order to secure the injection molding unit S against tendencies of misalignment or transverse shift during the normal injection operation, during a horizontal shift for setting to other injection openings or during its removal, in the zone of the adjusting means 29 strips 46 are arranged which, as may be observed particularly in FIG. 6, are formed by an angled sheet metal bar. In a similar manner, the vertical bar legs of another set of strips 47 engage, for guiding purposes, the sides of the runner rollers 16. The strips 47 too, are made of angled sheet metal bars.

Figure 11:
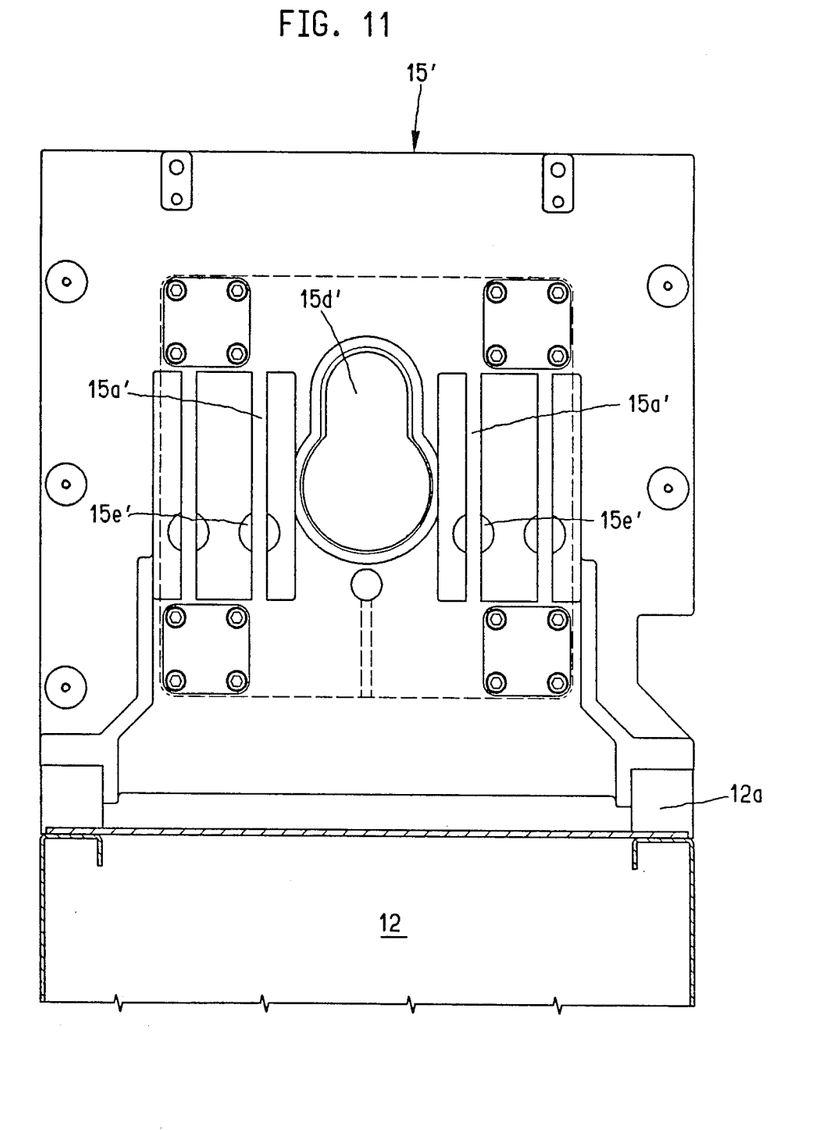
FIG. 11 is a view similar to FIG. 10, of another preferred embodiment of a mold carrier for shifting the injection molding unit in a vertical direction.

For a vertical shifting direction of the injection molding unit S, the mold carrier may be designed according to the embodiment illustrated in FIG. 11. The stationary mold carrier 15' is provided with an aperture 15d' which is upwardly enlarged. Guides 15a' for the piston rods 14 extend vertically and are arranged in a horizontal plane. As a shifting device for the vertical displacement of the injection molding unit S, a known hoisting frame may be used, as disclosed, for example, in German Offenlegungsschrift No. 2,156,843.

Figure 12:
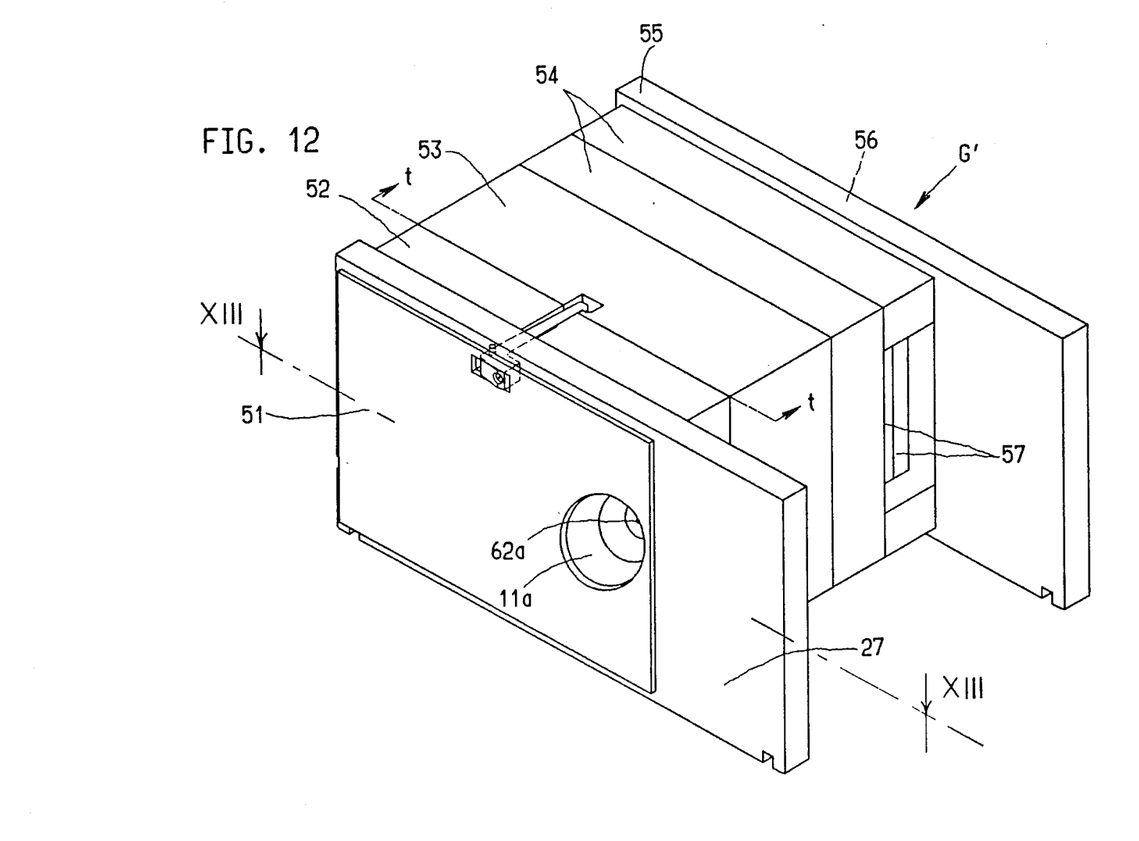
FIG. 12 is a perspective view of an injection mold assembly having a non-central injection opening.

The injection mold assembly G' shown in FIGS. 12 and 13 serves, with its eccentrically arranged injection opening 11a, for example, for the manufacture of an optical lens 62. That half of the injection mold assembly G' which is secured to the stationary mold carrier 15 comprises an engagement plate 27 equipped with an insulating plate 51, a boundary plate 52 which bounds the parting plane t—t of the injection mold assembly G' and the mold cavity for the optical lens 62. The other mold half which is secured to the movable mold carrier of the mold closing unit of the injection molding machine includes an engagement plate 55 equipped with an insulating plate 56, a contour plate 53 as well as further plates 54 and an ejecting mechanism 57 including ejection pins 61 secured to holding plate 57a. The mold cavity for the optical lens 62 lies symmetrically to the central axis s'—s' in the zone of the parting plane t—t. Accordingly, during injection of the synthetic material into the mold cavity, the thus-generated mold separating forces P are symmetrically distributed about the central axis s'—s', as shown in FIG. 14. Stated differently, the center of the mold separating forces P coincides with the center of the mold cavity. The center of the mold cavity, in turn, is aligned with the central axis s'—s' of the mold assembly G'. In this manner, harmful asymmetrical bending stresses in the injection mold assembly are suppressed to a substantial extent. The non-central frustoconical injection opening 11a extends almost to the parting plane t—t. The plasticized synthetic material is admitted through a short injection channel 62a into the lateral edge of the mold cavity and is there deflected in the direction of the central axis s'—s' while turbulences are generated.

For specific requirements involving injection technology, it may be expedient to provide two mutually perpendicularly arranged shifting devices for the injection molding unit S. In such a case, by means of combining the horizontal shifting device with a vertical shifting or pivoting device, any desired point of the injection mold assembly in the zone of the extended aperture 15d of the stationary mold carrier 15 may be reached.

The present disclosure relates to subject matter contained in Federal Republic of Germany Patent Applications No. P 37 15 628.4 (filed May 11th, 1987) and No. P 37 22 228.7 (filed July 4th, 1987) which are incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine including
   a machine bed,
   a mold closing unit arranged on the machine bed and having a symmetry axis; the mold closing unit having a stationary mold carrier having a mold engaging side and a reverse side and a throughgoing aperture passing from the reverse side to the mold engaging side;
   a first mold assembly having a first mold cavity and a central injection opening communicating with the first mold cavity;
   a second mold assembly having a central axis, a second mold cavity and an off-center injection opening communicating with said second mold cavity;
   said first and second mold cavities being selectively receivable in said mold closing unit; said central injection opening being centrally aligned with said symmetry axis of said mold closing unit when said first mold assembly is accommodated in said mold closing unit and said off-center injection opening being out of alignment with said symmetry axis of said mold closing unit when said second mold assembly is accommodated in said mold closing unit;
   an injection molding unit arranged on said machine bed; said injection molding unit having a first working position in which it is movable, through said throughgoing aperture of said stationary mold carrier, into engagement with said first mold assembly for injecting plastic material into said first mold assembly through said central injection opening in a central injection axis; said injection molding unit having a second working position in which it is movable, through said throughgoing aperture of said stationary mold carrier, into engagement with said second mold assembly for injecting plastic material into said second mold assembly through said off-center injection opening in an off-center injection axis situated spaced from said central injection axis;
   a transposing device including means for shifting said injection molding unit parallel to itself from one of its said working positions into another relative to said stationary mold carrier in a transposing plane containing said central injection axis; and
   a driving means for moving said injection molding unit in one of said working positions cyclically into and out of engagement with the mold assembly accommodated in said mold closing unit for performing an injection molding operation in one of said injection axes;
   the improvement wherein said stationary mold carrier has, at said reverse side, parts defining guide grooves oriented transversely to said central and off-center injection axes; further wherein said driving means includes hydraulic power cylinders arranged symmetrically to said central and off-center injection axes; each hydraulic power cylinder having a piston rod on which said injection molding unit is supported; each said piston rod having a coupling terminus being received in a respective guide groove for guiding the respective piston rod therein during motion of said injection molding unit between said working positions relative to said stationary mold carrier; said coupling terminus of each said piston rod being prevented by the respective guide groove from moving in a direction parallel to a longitudinal axis of the respective piston rod, whereby said piston rods are axially immobilized; each said hydraulic power cylinder having an axis lying in a common plane being inclined at an oblique angle to the horizontal; said transposing device comprising a platform; the improvement further comprising support means for supporting said piston rods on said platform.

2. An injection molding machine as defined in claim 1, wherein there are a plurality of second working positions and an off-center injection axis associated with each second working position; further wherein said transposing plane has two opposite sides separated by said central injection axis; all of the off-center injection axes lying in said transposing plane parallel to said central axis and being situated on the same side of said transposing plane.

3. An injection molding machine as defined in claim 1, wherein said transposing plane has opposite first and second sides separated by said central injection axis; said off-center injection axis of said second working position lying in said transposing plane on said first side thereof; further wherein said injection molding unit has third and fourth working positions into which said injection molding unit is movable by said transposing device; said third and fourth working positions each having an off-center injection axis lying in said transposing plane on said second side thereof; the off-center injection axes of said third and fourth working positions being parallel to one another and to said central injection axis; the off-center injection axis of said third working position traversing said passage area of said throughgoing aperture of said stationary mold carrier and the off-center injection axis of said fourth working position traversing said stationary mold carrier externally of said passage area.

4. An injection molding machine as defined in claim 3, wherein some parts of said stationary mold carrier forming said guide groove are associated with said third working position of said injection molding unit and allow axial travel of said coupling terminus of each said piston rod out of said guide grooves for permitting a complete removal of the injection molding unit from said stationary mold carrier in a direction parallel to said central injection axis; further wherein said stationary mold carrier has coolant-carrying channels in a zone thereof aligned with the off-center injection axis of said fourth working position to cool plastic material impinging on said reverse side of said stationary mold carrier after being expelled from said injection molding unit in said fourth working position thereof.

5. An injection molding machine as defined in claim 1, wherein said transposing device comprises
a drive motor,
a threaded spindle rotatably connected to said drive motor,
a travelling nut mounted on said spindle and being axially displaceable on said spindle by the rotation thereof; and
a position determining device for indicating a momentary axial position of said travelling nut with respect to said spindle.

6. An injection molding machine as defined in claim 5, wherein said spindle is a roller ball spindle and said travelling nut is a roller ball nut.

7. An injection molding machine as defined in claim 5, wherein said position determining device comprises a potentiometer.

8. An injection molding machine as defined in claim 1, wherein said transposing device comprises
a plurality of horizontal, stationary guide columns mounted on said machine bend and oriented perpendicularly to said central injection axis;
said platform being mounted on said guide columns for displacement thereon in a direction perpendicular to said central injection axis; said injection molding unit being mounted on said platform to be carried thereby;
a drive motor;
a threaded spindle mounted on said platform and being axially stationarily supported with respect thereto; said drive motor being drivingly connected to said spindle for rotating said spindle;
a travelling nut stationarily mounted on one of said guide columns and being threaded on said spindle and being axially displaceable by said spindle by the rotation thereof.

9. An injection molding machine as defined in claim 8, wherein said machine bed has first and second opposite lateral sides; first support brackets affixed to said machine bed at said first lateral side; each said first support bracket having an opening of a closed circumference; a first end of each said guide column passing through the opening of a respective said first support bracket; second support brackets affixed to said machine bed at said second lateral side; each said second support bracket having an upwardlyopen, cradle-like opening; a second end of each said guide column lying in the cradle-like opening of a respective said second support bracket.

10. An injection molding machine as defined in claim 9, further comprising bars affixed to said platform and oriented perpendicularly to said guide columns and parallel to said central injection axis; said bars being arranged for preventing said injection molding unit from displacement with respect to said platform in a direction transverse to said central injection axis.

11. An injection molding machine as defined in claim 1, wherein said transposing device includes means for shifting said injection molding unit parallel to itself in a horizontal direction, and further wherein said oblique angle is about 45°.

12. An injection molding machine as defined in claim 1, wherein each said coupling terminus has diametrically opposite constrictions; respective said parts defining said guide grooves engaging into said constrictions for the axial immobilization of said piston rods.

13. An injection molding machine as defined in claim 1, wherein said platform is substantially horizontally oriented and further wherein said hydraulic power cylinders and the piston rods are situated above said platform at a vertical distance therefrom.

* * * * *